Jan. 26, 1960          J. E. JACOBS          2,922,887
INSPECTION APPARATUS AND METHOD
Filed April 26, 1954          2 Sheets-Sheet 1
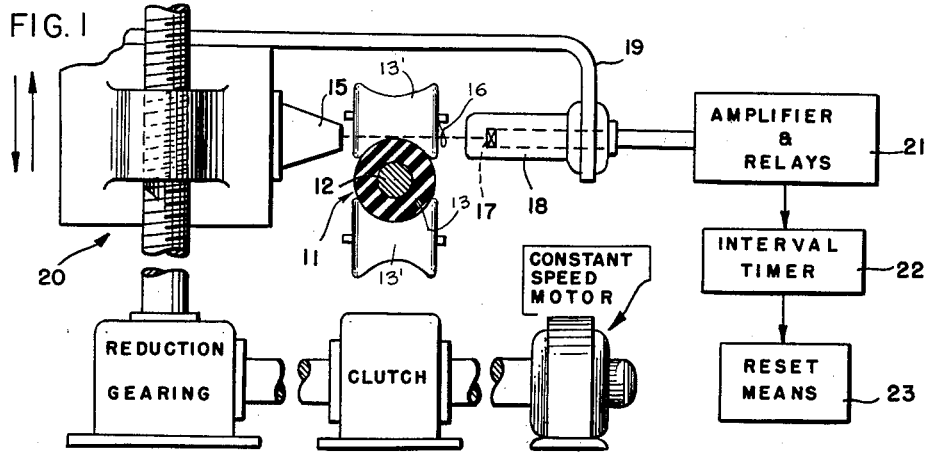
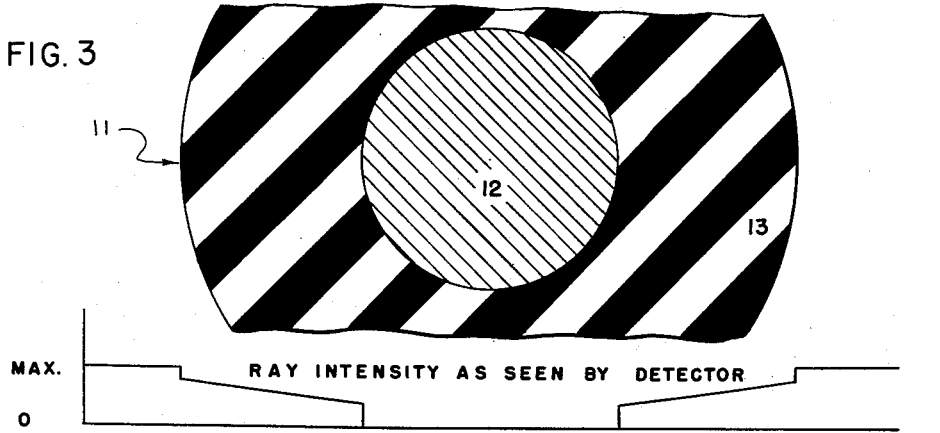
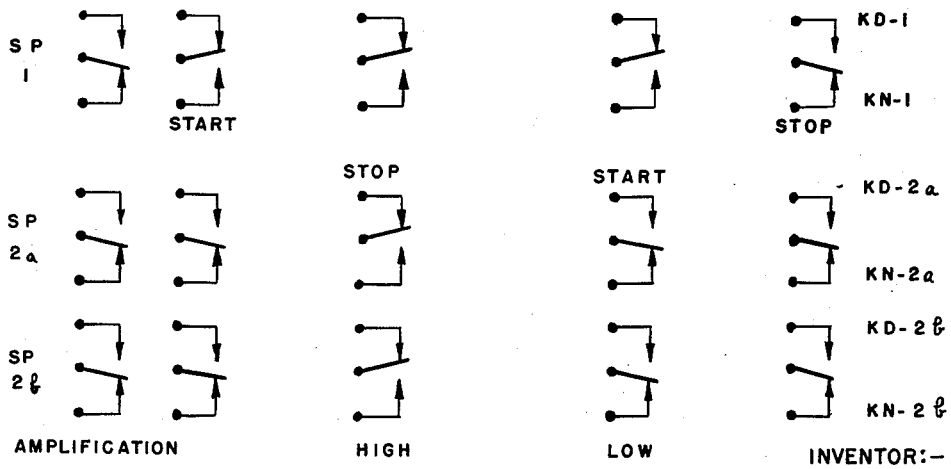
INVENTOR:—
JOHN E. JACOBS
BY:—
*Junius F. Cook, Jr.*
ATTORNEY Jan. 26, 1960

J. E. JACOBS 2,922,887

INSPECTION APPARATUS AND METHOD

Filed April 26, 1954

INVENTOR:—
JOHN E. JACOBS

BY:—
Junius F. Cook, Jr.

ATTORNEY

United States Patent Office 2,922,887
Patented Jan. 26, 1960

2,922,887

INSPECTION APPARATUS AND METHOD

John E. Jacobs, Milwaukee, Wis., assignor to General Electric Company, a corporation of New York Application April 26, 1954, Serial No. 425,473

20 Claims. (Cl. 250—83.3)

This invention relates in general to the inspection of cored cables, such as insulated electrical conducting cable, the invention having more particular reference to improved means for and method of examining cored cable material by means of penetrating radiations, such as X-rays.

An important object of the present invention is to provide for the continuous high speed inspection of cored cable, as the same is fed longitudinally through an inspection station, to determine more especially the concentricity of the cable core within its surrounding sheath as well as the continuity of the core, the same being particularly desirable in connection with the manufacture of so-called extruded cable embodying a sheath of plastic material formed about and applied to a continuous core element, as of wire, as an extrusion process.

The plastic sheath of extruded cable, as discharged at the extruding nozzle of cable producing equipment, may be in soft, raw, or uncured condition requiring the cable to be traveled a distance of the order of several hundred feet through a suitable curing oven to convert the sheath to a usefully hard condition. As emitted at the extrusion nozzle and until at least partially cured, the sheath material may be so soft as to preclude engagement of the cable with testing equipment or other devices capable of abrading the uncured sheath material. It is nevertheless highly desirable in the interests of manufacturing economy to examine the cable for core concentricity immediately upon emergence from the extrusion nozzle in order to allow for prompt correction of any core eccentricity that may develop at the extrusion nozzle. Where concentricity inspection is performed after passage of the cable through the curing oven, abnormal variation from desired concentricity will only be revealed after the production of hundreds of feet of defective cable.

Accordingly, another important object of the present invention is to provide means operable entirely out of physical contact with a cored cable to gauge cable core concentricity; a further object being to provide apparatus of the character mentioned for applying a penetrating ray beam in scanning a cored cable to determine the concentricity of the core therein.

Another important object is to provide means for determining cable concentricity by moving a beam of penetrating rays at a predetermined rate of speed transversely of a cored cable to determine cable core concentricity in terms of elapsed time required for the beam to traverse the portions of the cable sheath extending on diametrically opposite sides of the core.

Another important object is to provide cored cable concentricity inspection apparatus comprising a penetrating ray beam source and means to shift the same to cause a scanning beam, emitted by said source, to move at selected speed transversely back and forth across a cored cable to be inspected, a ray sensitive detector disposed at all times in the path of said beam, and timing means controlled by said detector for ascertaining the extent of the time intervals within which the beam traverses the sheath portions of the cable on opposite sides of the core to thereby determine core concentricity in terms of said intervals; a further important object being to provide an electrical control system operable to indicate core concentricity conditions.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a schematic illustration of apparatus embodying the present invention;

Fig. 3 is a diagrammatic representation showing various relationships which prevail during the operation of the apparatus.

Figure 2:
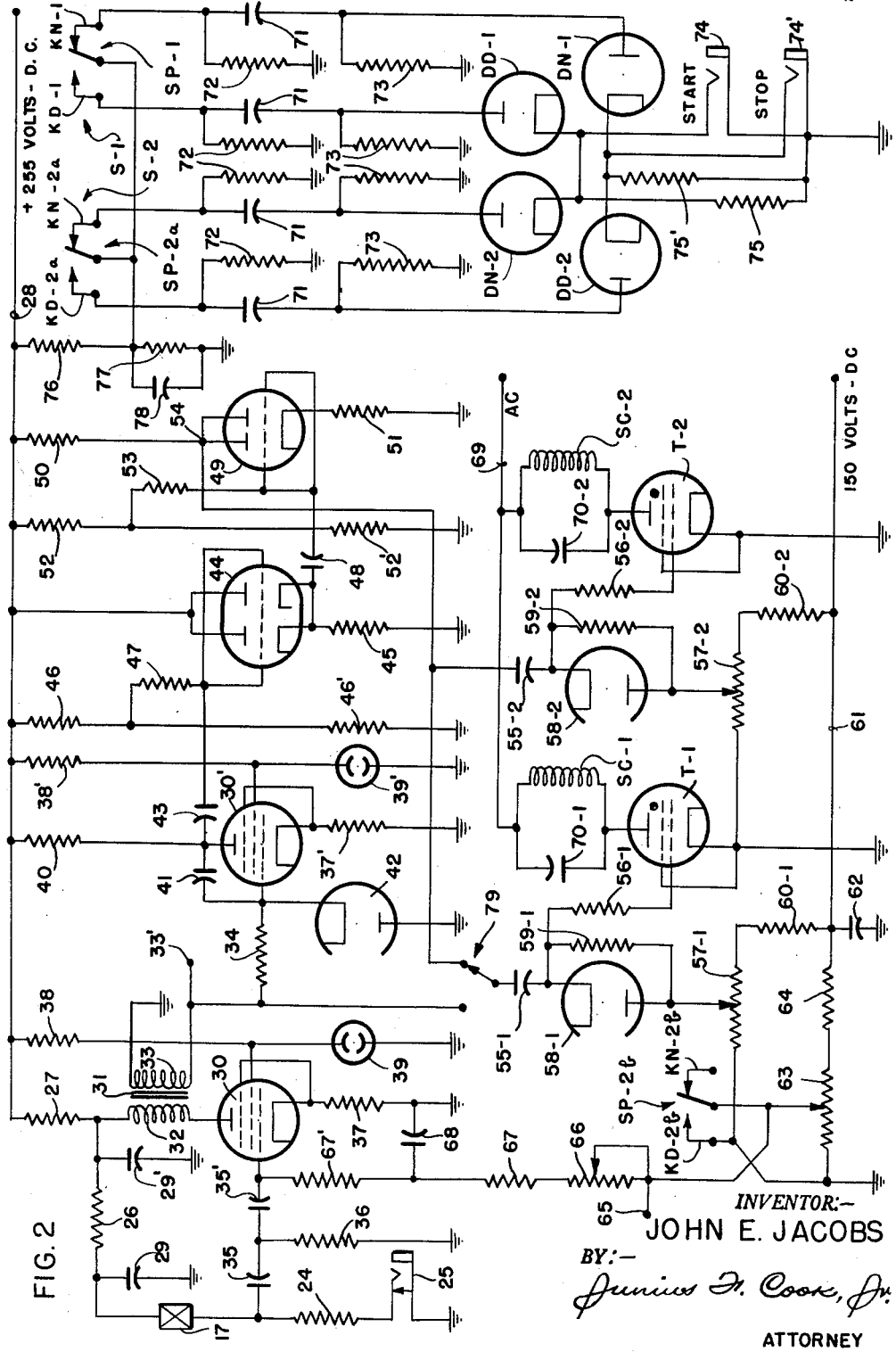
Fig. 2 is a diagram of electrical connections comprising a portion of the equipment shown in Fig. 1.

To illustrate the invention the drawings show apparatus for the inspection of a cable 11 comprising a core 12 and an outer sheath 13, the apparatus being particularly adapted for determining the concentricity of the core 12 within the sheath 13, without making physical contact with the cable. In this connection, it should be understood that, in insulated electrical conducting cable, it is highly desirable that the conducting core have uniform concentricity within the enclosing sheath, throughout the length of the cable, in the interests of optimum insulating effectiveness of the sheath, any eccentricity of the core within the sheath resulting in a corresponding reduction of the insulating capacity of the sheath. Uniformity of core concentricity, of course, may also be of importance in cored cable other than electrical conductor cable. The apparatus of the present invention, accordingly, is particularly well suited for the inspection of extruded cable at the moment of discharge thereof from a cable extruding nozzle.

To these ends, the inspection apparatus may comprise a suitable penetrating ray source 14, such as an X-ray generating tube, enclosed in a suitable casing substantially impervious to X-rays and provided with collimating window means 15 for the emission of a ray beam 16 along a sharply defined path extending radially outwardly of the ray source 14. The apparatus also includes a ray sensitive detector 17, preferably enclosed in a protective and light-tight housing 18 and supported in fixed, spaced apart relationship with respect to the ray source 14 and in alinement with the beam 16, as by means of a suitable support bracket 19 of any preferred character. The ray source and detector thus may be rigidly interconnected to form a scanning unit or head 20.

Any suitable or preferred means may be provided for supporting the ray source 14 and the ray sensitive detector 17 on opposite sides of the cable 11 at a cable inspecting station, as at the discharge end of a cable extruding nozzle, through which station the cable may be traveled and guided, in the direction of its longitudinal axis, by any suitable or preferred cable shifting means such as the driving rollers 13'. Means of any suitable or preferred character also is provided for shifting the scanning head 20, comprising the ray source and the sensitive detector, back and forth at selected speed in a direction transversely of the cable, as indicated by the directional arrows in Fig. 1. Such movement of the ray source and detector will cause the beam 16 to scan the cable 11 from one side thereof to the other, the beam first traversing only the sheath portions 13 on one side of the core, then passing through the core of the cable, and finally traversing only the sheath portions of the cable on the opposite side of the core.

The mechanism for shifting the ray source and the detector transversely of the cable 11 at the inspection station may comprise a preferably constant speed motor, and geared transmission means driven by the motor and drivingly connected with the housing containing the ray source 14, such transmission means preferably including a screw threaded stem and cooperating nut interconnected with the ray source housing for moving the source and the sensitive detector preferably at a precisely uniform rate of speed, at least during the intervals while the scanning beam 16 is traversing any portion of the cable under inspection. The transmission mechanism may include clutch means for connecting and disconnecting the driving motor, and may also include reverse driving means.

The ray sensitive detector 17, as a consequence of the foregoing arrangement, may be continuously irradiated by the beam 16 as the ray source and detector are moved back and forth transversely of the cable being inspected. The intensity of the beam which impinges upon the detector 17 will be determined by the ray absorbing character of any material through which the beam passes in traveling from the ray source to the detector. Since the materials of the sheath and of the core normally have unlike ray absorbing characteristics, it will be seen that the intensity of ray impingement on the detector will be substantially lower during an interval while the beam passes through the core of the cable than while the beam is traversing only the sheath material outwardly of the core. Where the core 12 comprises metal wire, which is relatively more opaque to penetrating rays than is the plastic sheath material, ray impingement upon the detector will be substantially more intense while the beam 16 is traversing sheath material only than when the beam penetrates the cable core 12.

The detector 17 preferably comprises a semi-conductor material having electrical characteristics adapted to vary in accordance with the intensity of ray impingement thereon. The detector, accordingly, may indicate in terms of its said variable characteristic, may indicate the progress of the beam 16 as it passes transversely through the cable 11. The said variable characteristic of the detector will be altered in response to changes in ray impinging intensity which occur when the ray beam 16 moves into position traversing the sheath 13, and also when it moves into position penetrating the core 12. For the accomplishment of the foregoing function, the detector 17 preferably comprises a tiny crystal of cadmium sulphide or similar electron donor semi-conductor material, such as mercuric sulphide or cadmium selenide, the same normally affording high electrical impedance to the passage of current therethrough, such impedance characteristic varying inversely with the intensity of X-ray impingement on the semi-conductor material. Impedance reduction in cadmium sulphide and similar semi-conductors is a proportional function of the intensity of impinging radiation, and, as more fully explained in copending applications Serial Nos. 190,801 and 232,073, now Patent Nos. 2,706,790 and 2,706,791, respectively filed October 18, 1950, and June 18, 1951, the intensity of the impinging rays may be accurately measured in terms of the apparent impedance of the semi-conductor material.

For the purpose of demonstrating the present invention, a semi-conductor may be defined as a substance having electrical resistance, or reactance, or both, which vary in accordance with the intensity of rays to which the substance is exposed. The electrical resistance and reactance characteristics of a conductor are commonly referred to as its electrical impedance. Cadmium and mercuric sulphide, and cadmium selenide, in this respect, have been found to be semi-conductors usefully sensitive to X-rays, the same in the absence of X-rays having impedance characteristics of such high order as to constitute them as virtual insulators capable of substantially preventing the flow of electrical energy therethrough. The impedance characteristics of cadmium and mercuric sulphide, and cadmium selenide, as explained at length in the aforesaid copending applications, becomes reduced as a proportional function of incident X-ray intensity, whereby the materials become electrically conducting in proportion to the intensity of the rays impinging thereon.

The present invention takes advantage of the current amplifying character of the detector 17, which in effect comprises a tiny amplifier capable of delivering a substantial quantity of electrical current in response to X-ray impingement thereon. In this connection, it is thought that the amplifying character of the detector is due to the fact that cadmium and mercury suphide and cadmium selenide comprise what may be called excess electron or electron donor semi-conductors, the excess energy necessary to produce amplified currents in the detector being derived from the electron producing character of the material itself, when irradiated or triggered by exposure to X-rays.

Any suitable or preferred means may be employed for determining the impedance of the detector 17 and for applying changes in such measured impedance to control load devices for indicating or recording cable concentricity conditions or for actuating reject apparatus for marking defective cable, or for automatically adjusting the associated cable producing equipment for correction of abnormal concentricity conditions in the cable as discharged from the extruding equipment. The present invention, however, contemplates the determination of cable core concentricity by measuring the time interval required by the ray beam 16, moving at uniform speed, to scan the sheath material on opposite sides of the core, true concentricity being indicated by equal scanning intervals required by the beam in traversing only the sheath material on opposite sides of the core, eccentricity being shown by scanning intervals of unequal duration.

Where the rate of movement of the X-ray source and the detector in a direction transversely of the cable under inspection is known, the displacement of the beam 16, per unit of time, in such direction, may be readily determined, and since the displacement is accomplished at a uniform rate of speed, elapsed time and corresponding displacement of the beam may be employed interchangeably for the determination of cable core concentricity. Accordingly, the present invention contemplates the connection of the detector 17 as through suitable translation means 21 for the control of interval timing mechanism 22, which in turn may be connected to control the operation of any desired load device 23, such as indicating, recording, defective cable marking, or other preferred reject means. The interval timing mechanism may include indicating elements for showing the duration of a timed interval.

Any suitable or preferred timing mechanism 22 may be employed, the same preferably comprising electrical switching means, apparatus operable to set the switches in a selected switching position, and timing equipment operable to throw the switching means to another switching position after the elapse of a precisely measured time interval. Accordingly, the timing mechanism may be adjusted to measure a selected time interval corresponding with the minimum desired insulation thickness to be maintained in the sheath of the cable 11. Thereafter, as the beam 16, in moving transversely of the cable under inspection, encounters the outer surface of the cable sheath, on one side of the cable, the consequent reduction of the intensity of ray impingement on the detector will correspondingly alter the impedance of the detector. Such impedance change may be applied to control the translation means 21 to start the interval timer 22 in operation. Thereafter, the beam 16, having scanned the sheath material of the cable on one side of the cable core, will encounter the cable core and consequently the intensity of ray impingement of the beam 16 on the detector 17 will be correspondingly reduced. The resulting increase in the impedance of the detector 17, accordingly, may be applied to control the translation means 21 to stop the interval timer 22. The scanned thickness of the insulating sheath may be determined, in terms of elapsed time, by observing the time indicating elements of the timer mechanism.

Stoppage of the timer mechanism by operation of the inspection apparatus prior to the elapse of the preset time interval corresponding with a desired insulation thickness, will indicate that the sheath is of less than the desired thickness. Conversely, expiration of the preset time interval before the beam 16 shall have fully traversed the sheath portions on one side of the core will indicate greater than desired sheath thickness. In either event, a signal may be made available to mark the cable as defective, or otherwise to operate desired load devices such as mechanisms for indicating or recording cable concentricity. As the beam 16, having traversed the cable core as well as the sheath on one side thereof, emerges outwardly of the core, on the opposite side thereof, the interval timer may again be started in response to decreased detector impedance for the purpose of measuring the thickness of insulation extending at said other side of the core. The timing mechanism may again be stopped in response to further decrease in detector impedance as the beam emerges outwardly of the cable sheath at the conclusion of its scanning movement therethrough.

For the operation of the system, the detector 17 may be interconnected in an impedance measuring circuit including a suitable source of impedance measuring potential, in series with suitable resistance means including a resistor 24, one side of the detector, as shown, being connected to ground through the resistor 24 and a normally closed test jack switch 25, the other side of the detector being connected as through resistors 26 and 27 with the high side 28 of a suitable, preferably unidirectional potential source, the low side of which may be grounded. The impedance measuring circuit may include condensers 29, 29', respectively interconnected between ground and the opposite sides of the resistor 26. The detector 17 and the resistor 24 thus form a voltage divider, from which a potential corresponding with the variable impedance value of the detector may be derived and applied for the control of relay switch means in accordance with changes in the impedance of the detector 17.

Such switch means may include a single pole, double throw switch S–1, having an operating coil SC–1 and a switch blade SP–1, and a double pole, double throw switch S–2, having an operating coil SC–2 and a pair of switch blades SP–2a and SP–2b. The switch means S–1 and S–2 may be interconnected with the interval timer 22 and the operable means 23 to cause the same to function in desired fashion.

To these ends, potential derived at the voltage divider may be applied to control amplifying means which, as shown in the drawings, may comprise a pair of electron flow amplifiers 30 and 30' forming corresponding amplifying stages connected to operate a pair of switch actuating thyratron tubes T–1 and T–2, respectively connected to energize the operating coils SC–1 and SC–2 of the relay switches when the thyratron tubes are caused to fire under the control of the impedance measuring voltage produced in the detector circuit. The two amplification stages may be substantially identical, the stages as shown being coupled as by means of a transformer 31, having a primary winding 32 interconnected in the plate circuit of the amplifying tube 30 and a secondary winding 33, the opposite ends of which respectively are connected to ground and with the control grid of the amplifier tube 30', as through a resistor 34. If desired, a metering connection 33' may be provided at the ground remote side of the secondary winding 33 of the coupling transformer for the purpose of determining the output of the first amplification stage.

The impedance measuring potential produced in the detector circuit, as between ground and the ground remote side of the resistor 24, may be applied to the control grid of the amplifier tube 30, preferably through condensers 35 and 35' interconnected in series between the control grid of the tube 30 and the voltage divider comprising the detector 17 and the resistor 24, the interconnected sides of the condensers 35 and 35' being preferably grounded through a resistor 36. The cathodes of the amplifier tubes 30 and 30' may be connected each with its suppressor grid and to ground, respectively through resistors 37 and 37'. Means may be provided for maintaining a desired potential on the screen grids of the amplifier tubes 30 and 30', as by connecting said grids with the high side 28 of the power source, respectively through suitable resistors 38 and 38'. Suitable gas discharge voltage regulators 39 and 39', if desired, may also be connected respectively between ground and the screen grids of the amplifier tubes 30 and 30'.

The anode or plate of the detector tube 30 may be connected through the primary winding 32 of the coupling transformer with the impedance measuring circuit between the resistors 26 and 27 thereof. The anode or plate of the detector tube 30' may be connected with the high side 28 of the power source through a resistor 40. The anode or plate of the amplifier tube 30' may also be connected with the control grid thereof through a condenser 41, and said grid may be connected to ground through a diode device 42, whereby to limit the amplitude of the negative part of the signal applied on the grid of the amplifying tube 30' through the resistor 34.

The output side of the second amplification stage may be capacity coupled, as through a condenser 43, connected between the anode or plate of the amplifier tube 30' and the control grid means of an electron flow cathode follower tube 44. The tube 44 also includes anode means connected with the high side 28 of the potential source and cathode means connected to ground as through a resistor 45, resistors 46, 46' being connected between ground and the high side 28 of the power source, and through a resistor 47 with the grid means of the cathode follower tube, in order to provide a fixed bias for said tube.

The output side of the cathode follower tube 44 may be capacity coupled, as through a condenser 48, connected between the cathode means of the follower tube 44 and the control grid means of an electron flow inverter tube 49. The inverter tube 49 also includes anode means connected as through a resistor 50 with the high side 28 of the potential source, and cathode means connected to ground as through a resistor 51, resistors 52, 52' being connected between ground and the high side 28 of the power source, and through a resistor 53 with the grid means of the inverter tube, in order to provide a fixed bias for said tube.

The anode means of the inverter tube 49 may be provided with a metering terminal 54 to facilitate the measurement of the output of the inverter tube. The anode means of the inverter tube also may be connected as through condensers 55–1 and 55–2 and resistors 56–1 and 56–2, respectively with the control grids of the thyratron tubes T–1 and T–2. The interconnected ends of the condensers and resistors 55–1, 55–2, and 56–1, 56–2 may be connected with the adjustable elements of corresponding potentiometers 57–1 and 57–2, through diode devices 58–1 and 58–2, having cathodes respectively connected with the condensers and resistors, the anodes of the diode devices being connected with the adjustable elements of the potentiometers. If desired, resistors 59–1 and 59–2 of relatively high value may be interconnected respectively between the anodes and cathodes of the diode devices 58–1 and 58–2.

The potentiometers may each comprise a resistance element having a grounded side and a ground remote side connected through an associated resistor 60–1, 60–2 with a common connection station 61, said connection station being connected to ground, as through a condenser 62. The connection station 61 is electrically connected with and comprises the high side of a suitable source of negative biasing potential, the low side of which may be connected to ground. Accordingly, the circuits, including the resistors and potentiometers connected between the station 61 and the control grids of the thyratrons, provide means for controlling the regulating the negative electrical bias maintained upon the control grids of the thyratrons, the diode devices 58–1 and 58–2 serving to maintain the wave shape and potential level of the signal which is delivered from the inverter tube 49 through the coupling condensers 55–1 and 55–2 for application upon the control grids of the thyratron tubes.

The system also provides means for applying a controlled bias upon the control grid of the amplifier tube 30. To this end, the resistance element of an adjustable potentiometer 63 may be interconnected between ground and the negative bias potential connection station 61, preferably through a resistor 64.

The potentiometer 63 may include an adjustable member connected with the blade SP–2b, said blade and adjustable member being connected with a metering terminal 65 and with the control grid of the amplifier tube 30 through resistance means including an adjustable resistor 66 and resistance elements 67 and 67', the interconnected ends of the elements 67 and 67' being connected with the ground remote side of a grounded condenser 68.

The cathode of each thyratron tube may be electrically connected to ground and to the suppressor grid of the tube. The anodes of the thyratron tubes T–1 and T–2 may be respectively connected through the switch operating coils SC–1 and SC–2 and thence to conductor means 69 forming the high side of a suitable switch actuating power source, the low side of which should be connected to ground. Preferably, the switch operating power source connected between ground and the conductor means 69 is of fluctuating or alternating character. Condensers 70–1 and 70–2 are preferably connected respectively across the switch operating coils SC–1 and SC–2.

The value of intensity of ray impingement upon the detector 17 at which the thyratrons T–1 and T–2 are caused to fire may be determined by the adjustment of the potentiometers 57–1 and 57–2. The potentiometer 57–1, accordingly, may be adjusted to cause the thyratron T–1 to fire as the ray beam 16 first encounters the surface of the sheath 13 and to remain in action until the beam passes outwardly of the sheath on the opposite side of the cable. The potentiometer 57–2 may be adjusted to cause the thyratron T–2 to fire when the ray beam 16 first encounters the periphery of the cable core 12 on one side thereof, and to remain in action until the beam passes outwardly of the core at the opposite side thereof.

The switches S–1 and S–2 may comprise pairs of contact elements associated with each of the switch blades SP–1, 2a and 2b, the switch S–1 comprising elements KN–1 and KD–1 associated with the switch blade SP–1. The switch S–2 may comprise contact elements KN–2a and KD–2a associated with the blade SP–2a, and contact elements KN–2b and KD–2b associated with the switch blade SP–2b. The switches normally occupy the positions shown in Fig. 2 and in the first and fifth columns of Fig. 3, with the switch blades SP–1, 2a and 2b respectively in engagement with the contact elements KN–1, 2a and 2b. When the thyratrons T–1 and T–2 are fired, the poles of the switches are shifted respectively into engagement with the contacts KD–1, 2a and 2b.

The switch contacts KN–1 and 2a and KD–1 and 2a are connected with the interval timer mechanism 22 for the control thereof and of such reject means 23 as may be employed in association therewith. To this end, said contact elements may each be connected, as through a corresponding coupling condenser 71, with the anode of a corresponding diode device DN–1, DD–1, DN–2, DD–2. The opposite sides of each condenser 71 may be connected to ground through resistors 72 and 73. The cathodes of the diode devices DD–1 and DN–2 are interconnected together and may be connected to ground through a start jack connection receptacle 74, a resistor 75 being preferably shunted across the receptacle. The cathodes of the diode devices DD–2 and DN–1 are interconnected together and may be connected to ground through a stop jack connection receptacle 74', a resistor 75' being preferably shunted across the receptacle.

The switch blades SP–1 and 2a may be electrically connected with the high side 28 of the positive unidirectional potential power source, as through a resistor 76; and said blades may be connected to ground through a resistor 77 across which a condenser 78 may be shunted.

The operation of such a circuit and associated interval timer is such that as the cable edge is encountered by the scanning beam 16, relay S–1 operates. This causes the arm contact SP–1 to shift into engagement with terminal KD–1. The positive voltage pulse thus applied to the network 72, 71, DD–1, 75, causes the interval timer to start. It should be noted that only the leading edge of the pulse is passed by this network. When the cable core is reached by the beam 16, relay SC–2 is actuated. This causes the arm contact SP–2a to shift into engagement with contact KD–2a. The positive voltage pulse thus applied to the network 72, 71, 73, DD–2 and 75' causes the interval timer to stop. The timer may be designed to indicate the elapsed time interval measured between the starting and stopping of the timer and to compare such measured interval with a preselected elapsed time period for which the timer may be set, whereby to determine cable insulation acceptability. When the inspection beam 16 encounters the inner side of the cable sheath, after traversing through the core, the switch blade SP–2a will be caused to shift back into engagement with terminal KN–2a. The positive voltage pulse thereby applied to the network 72, 71, 73, DN–2 and 75 will cause the interval timer to start. As the scanning beam passes outwardly of the cable sheath, contact blade SP–1 will be caused to engage with contact KN–1. This applies a positive voltage pulse to the network 72, 71, 73, DN–1, 75' which causes the timer to stop. The elapsed time interval thus measured between the starting and stopping of the timer may be indicated and compared with a preselected interval value, as previously described.

If desired, selector switch means 79 may be provided for controllingly connecting the thyratron T–1 either with the inverter tube 49 or with the secondary winding of the coupling transformer 31, so that said thyratron may be operated by the detector controlled signal as delivered by the first amplification stage through the transformer, or by the signal as delivered through both amplification stages. The switch 79 facilitates adjustment of the system in accordance with the size and character of cable being inspected. In this connection, it may be noted that the thyratron T–1 is placed in operation and is disabled in response to the entry of the beam 16 into and the exit thereof from the cable sheath at the opposite sides thereof.

The operation of the thyratron T–1 thus defines the opposite side boundaries between the cable sheath 13 and circumambient atmosphere. Should the diameter of the cable be below a more or less arbitrary minimum, the amplifier may be caused to operate under saturated conditions whereby the definition of the outer surface of the cable sheath, as measured by the signal delivered at the tube 49, is insufficient to assure operation of the thyratron T-1 precisely when the beam 16 enters or exits from the cable sheath. To compensate for this condition where small diameter cables are under inspection, the switch 79 may be positioned to apply the signal as delivered from the first amplification stage to the control of the thyratron T-1. During the inspection of relatively heavy cables of large size, the switch may be positioned to apply the fully amplified signal for the operation of the thyratron T-1. In either case, the thyratron T-2 may be connected as shown for operation by the fully amplified signal, there being no difficulty in differentiating the boundaries of the relatively ray opaque material forming the cable core 12.

The principal function of the biasing circuit controlled by the switch SP-2b is to compensate for the sudden reduction and increase of penetrating ray intensity applied on the detector 17, respectively when the beam enters and exits from the relatively ray opaque material of the cable core. Where the intensity of the beam as applied on the detector is thus suddenly altered to an appreciable extent, the inability of the detector to track the change precisely becomes apparent. When ray intensity upon the detector is reduced, as when the beam penetrates the cable core 12, the operation of the switch SP-2b reduces the effective bias applied upon the control grid of the amplifier 30, thereby increasing over-all amplification. As soon as the scanning beam passes outwardly of the cable core 12, full bias is again applied upon the amplifier 30, by operation of the switch SP-2b, but remains electrically ineffective during a brief interval due to the time constant of the resistance-capacity circuit through which application of the bias on the amplifier 30 is accomplished. Adjustment of the potentiometer 66 determines the extent of the bias re-application delay interval. The reason for the delayed re-application of bias is to prevent possible retriggering of the relay, thereby causing erratic operation.

So long as the ray source 14 is capable of producing rays of intensity sufficient for adequate penetration of the cable being inspected, the selector switch and bias varying mechanism are not essential for the successful operation of the inspection apparatus. When the cable under inspection, however, is large enough to tax the output of the ray source, the foregoing adjustable control means serve to extend the useful range of the equipment.

It will be seen from the foregoing that the present invention provides apparatus operable to measure cable sheath thickness in terms of elapsed scanning time, and to operate any desired mechanism, such as defect indicating and recording apparatus and defective article reject means, in the event that such measured time interval differs from a desired or required interval as determined by comparatively associated interval timing means of any suitable, preferred or conventional character.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus for inspecting cable embodying a sheath enclosed core comprising scanning means operable to scan the cable with a penetrating ray beam, in a direction transversely of the longitudinal axis of the cable, at a selected rate of speed, and timing means controlled by said scanning means for measuring the time interval required for the beam to traverse the cable sheath.

2. Apparatus for inspecting cable embodying a sheath enclosed core comprising scanning means operable to scan the cable with a penetrating ray beam, in a direction transversely of the longitudinal axis of the cable, at a selected rate of speed, and timing means controlled by said scanning means for measuring the time intervals required for the beam to traverse the cable sheath on opposite sides of the core.

3. Apparatus for inspecting cable embodying a sheath enclosed core comprising scanning means operable to continuously scan the cable with a penetrating ray beam, in a direction transversely of the longitudinal axis of the cable, at a selected rate of speed, back and forth from one side of the cable to the other, and timing means controlled by said scanning means for measuring the time interval required for the beam to traverse the cable sheath.

4. Apparatus for inspecting cable embodying a sheath enclosed core comprising scanning means operable to scan the cable with a penetrating ray beam, in a direction transversely of the longitudinal axis of the cable, at a selected rate of speed, detecting means operable in response to ray intensity variations of the beam as it traverses the cable from one side thereof toward the other, and timing means controlled by said detecting means for measuring the time interval required for the beam to traverse the cable sheath.

5. Apparatus for inspecting cable embodying a sheath enclosed core comprising means for moving the cable continuously in the direction of its axis at an inspection station, scanning means operable to scan the cable with a penetrating ray beam by moving said beam at said station, in a direction transversely of the longitudinal axis of the cable, at a selected rate of speed, and timing means controlled by said scanning means for measuring the time interval required for the beam to traverse the cable sheath.

6. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the concentric sheath and core components of a cable from one side thereof toward the other, operable relay means, a translation system for actuating said relay means in accordance with the response of the detector to changes in the ray intensity of the beam as it transversely traverses a cable under inspection and timing means controlled by the relay means for measuring the interval required for the beam to scanningly traverse a said cable component.

7. Cable inspection apparatus comprising a penetrating ray source, a ray sensitive detector disposed in position to receive impingement of a scanning beam emitted by said source, means for moving said source and detector as a unit, whereby to cause the beam to scan the concentric sheath and core components of a cable transversely from one side thereof toward the other, operable relay means, a translation system for actuating said relay means in accordance with the response of the detector to changes in the ray intensity of the beam as it transversely traverses a cable under inspection and timing means controlled by the relay means for measuring the interval required for the beam to scanningly traverse a said cable component.

8. Cable inspection apparatus comprising a penetrating ray source, a ray sensitive detector disposed in position to receive impingement of a scanning beam emitted by said source, means for moving the cable in the direction of its longitudinal axis through an inspection station, means for moving said source and detector as a unit, whereby to cause the beam to scan the concentric sheath and core components of a cable from one side thereof toward the other, at said station, operable relay means, a translation system for actuating said relay means in accordance with the response of the detector to changes in the ray intensity of the beam as it transversely traverses a cable under inspection and timing means controlled by the relay means for measuring the interval required for the beam to scanningly traverse a said cable component.

9. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, operable relay means, and a translation system for actuating said relay means in accordance with the response of the detector element to changes in the ray intensity of the beam as it passes the outer surface of the cable sheath and also when it passes the side of the cable core.

10. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, a pair of operable relays, and translation means controlled by said detector for actuating one of said relays when the beam encounters the sheath of the cable, on one side thereof, and for actuating the other relay when the beam encounters one side of the cable core.

11. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side theerof toward the other, a pair of operable relays, and translation means controlled by said detector for actuating one of said relays when the beam passes outwardly of the cable core, on one side thereof, and for actuating the other relay when the beam passes outwardly of the sheath of the cable.

12. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, a pair of operable relays, and translation means controlled by said detector for actuating one of said relays when the beam encounters the sheath of the cable, on one side thereof, as well as when the beam passes outwardly of the sheath at the opposite side of the cable, and for actuating the other relay when the beam encounters one side of the cable core, as well as when the beam passes outwardly of the core at its opposite side.

13. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, a pair of operable relay devices, and a translation system controlled by said detector, said system embodying amplifying means providing a plurality of amplifying stages for operating said relays respectively when the beam passes the outer surface of the cable sheath and when it passes the side of the cable core, including selectively operable means for applying the output of any selected one of said amplifying stages for the operation of at least one of said relays.

14. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, a pair of operable relay devices, and a translation system controlled by said detector, said system embodying amplifying means for operating said relays respectively when the beam passes the outer surface of the cable sheath and when it passes the side of the cable core, means to normally bias said amplifying means at a selected level to obtain a desired degree of amplification, and means controlled by a said relay for altering said bias when said relay is operated.

15. Cable inspection apparatus comprising a penetrating ray source, a ray sensitive detector disposed in position to receive impingement of a scanning beam emitted by said source, means to relatively move said beam and a cable at uniform speed in a direction to shift the beam transversely of the longitudinal axis of the cable, whereby to cause the beam to scan the cable from one side thereof toward the other, elapsed time measuring relay means, a translation system for actuating said relay means in accordance with the response of the detector to changes in the ray intensity of the beam as it passes the outer surface of the cable sheath and also when it passes the side of the cable core, to thereby measure the thickness of said sheath in terms of elapsed time intervals of operation of said relay means, an interval timer, and a load device operable under the control of said interval timer and said elapsed time measuring relay means.

16. Cable apparatus as set forth in claim 15, wherein said relay means controls the starting in operation of said interval timer, including means controlled by said timer and said time measuring relay means and operable to actuate the load device in response to a predetermined difference between a time interval measured by said relay means and a preset interval measured by said timer.

17. Cable inspection apparatus comprising a penetrating ray source, a ray sensitive detector disposed in position to receive impingement of a scanning beam emitted by said source, means for relatively moving said beam and a cable at uniform speed in a direction to shift the beam transversely of the longitudinal axis of the cable, whereby to cause the beam to scan the cable from one side thereof toward the other, operable relay means, gaseous conduction valve means for controlling the delivery of operating energy to said relay means, and a translation system for operating said gaseous conduction valve means in accordance with the response of the detector to changes in the ray intensity of the beam as it transversely traverses a cable under inspection.

18. Cable inspection apparatus as set forth in claim 17, wherein said translation system comprises amplifying means including means to normally bias the same for operation at a selected amplifying level, and means controlled by said relay means for altering said bias to change the amplifying level of said amplifying means when said relay means is operated.

19. Cable inspection apparatus comprising a penetrating ray source, a ray sensitive detector disposed in position to receive impingement of a scanning beam emitted by said source, means for relatively moving said beam and a cable at uniform speed in a direction to shift the beam transversely of the longitudinal axis of the cable, whereby to cause the beam to scan the cable from one side thereof toward the other, a pair of operable relay devices, a pair of gaseous conduction valves each operably connected with a corresponding one of said relay devices for controlling the delivery of operating energy thereto, and a translation system for operating one of said gaseous conduction valves in accordance with the response of said detector, as the beam encounters the sheath of the cable on one side thereof and when the beam passes outwardly of the sheath at the opposite side of the cable, and for operating the other of said valves in accordance with the response of said detector, as the beam encounters the core of the cable on one side thereof and when the beam passes outwardly of the core at its opposite side.

20. Cable inspection apparatus as set forth in claim 19, wherein the translation system embodies amplifying means providing a plurality of amplifying stages, including selectively operable means for applying the output of a selected one of said amplifying stages for controlling the operation of at least one of said valves.

References Cited in the file of this patent

UNITED STATES PATENTS

| | | |
|---|---|---|
| 2,298,942 | Hicks et al. | Oct. 13, 1942 |
| 2,370,163 | Hare | Feb. 27, 1945 |
| 2,413,486 | Denyssen | Dec. 31, 1946 |
| 2,525,292 | Fua et al. | Oct. 10, 1950 |
| 2,532,644 | Robinson | Dec. 5, 1950 |
| 2,659,823 | Vossberg | Nov. 17, 1953 |
| 2,798,605 | Richards | July 9, 1957 |

OTHER REFERENCES

"An Economic Industrial X-Ray Detector," by Frerichs and Jacobs, General Electric Review, August 1951, pages 42–45.